Aug. 26, 1941.   V. H. VAN SANT   2,253,921
VARIABLE SPEED TRANSMISSION
Filed June 2, 1941   4 Sheets-Sheet 1
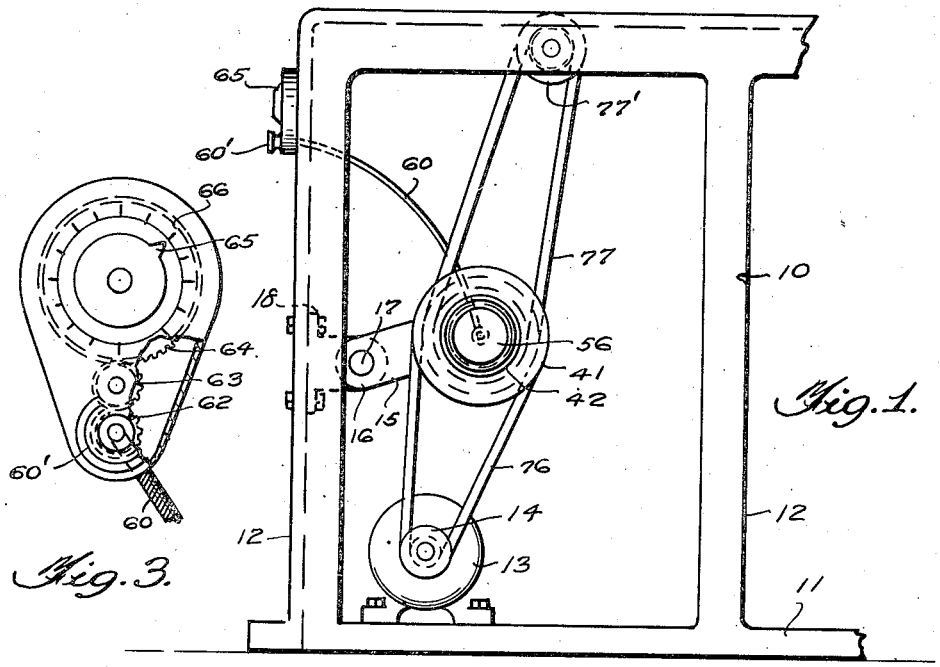
Fig. 1.
Fig. 3.
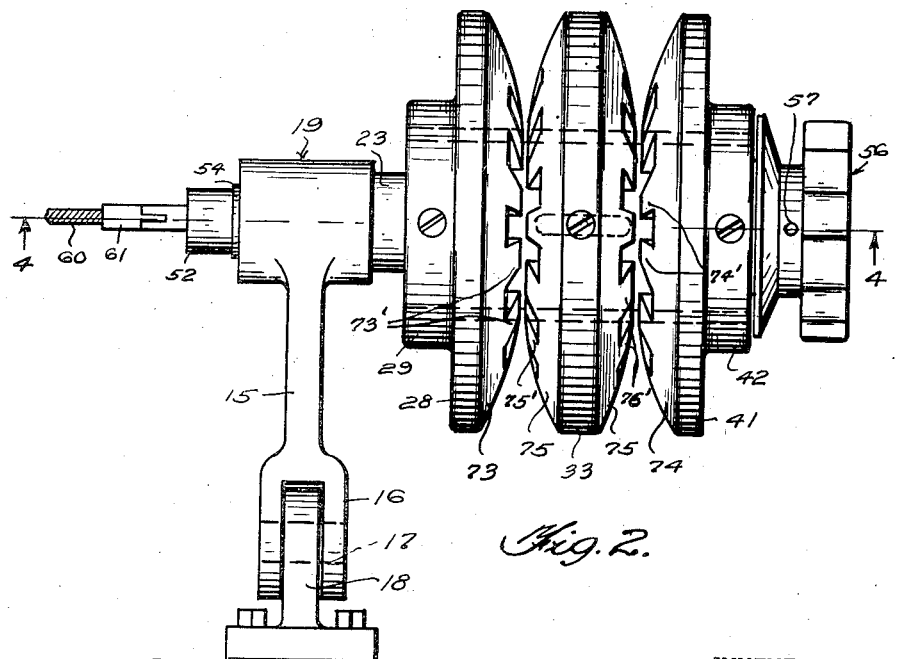
Fig. 2.
INVENTOR.
VICTOR H. VAN SANT,
BY

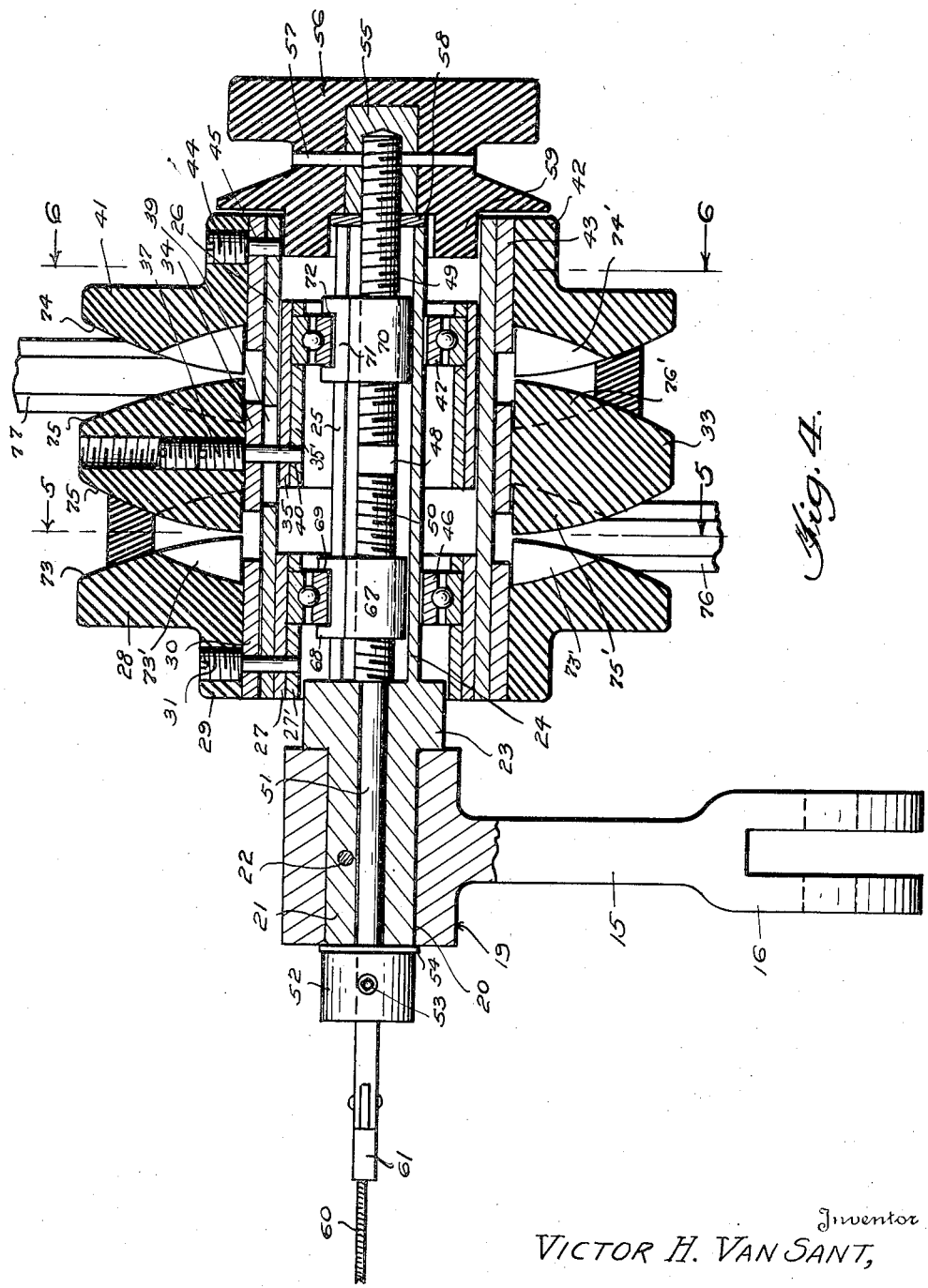

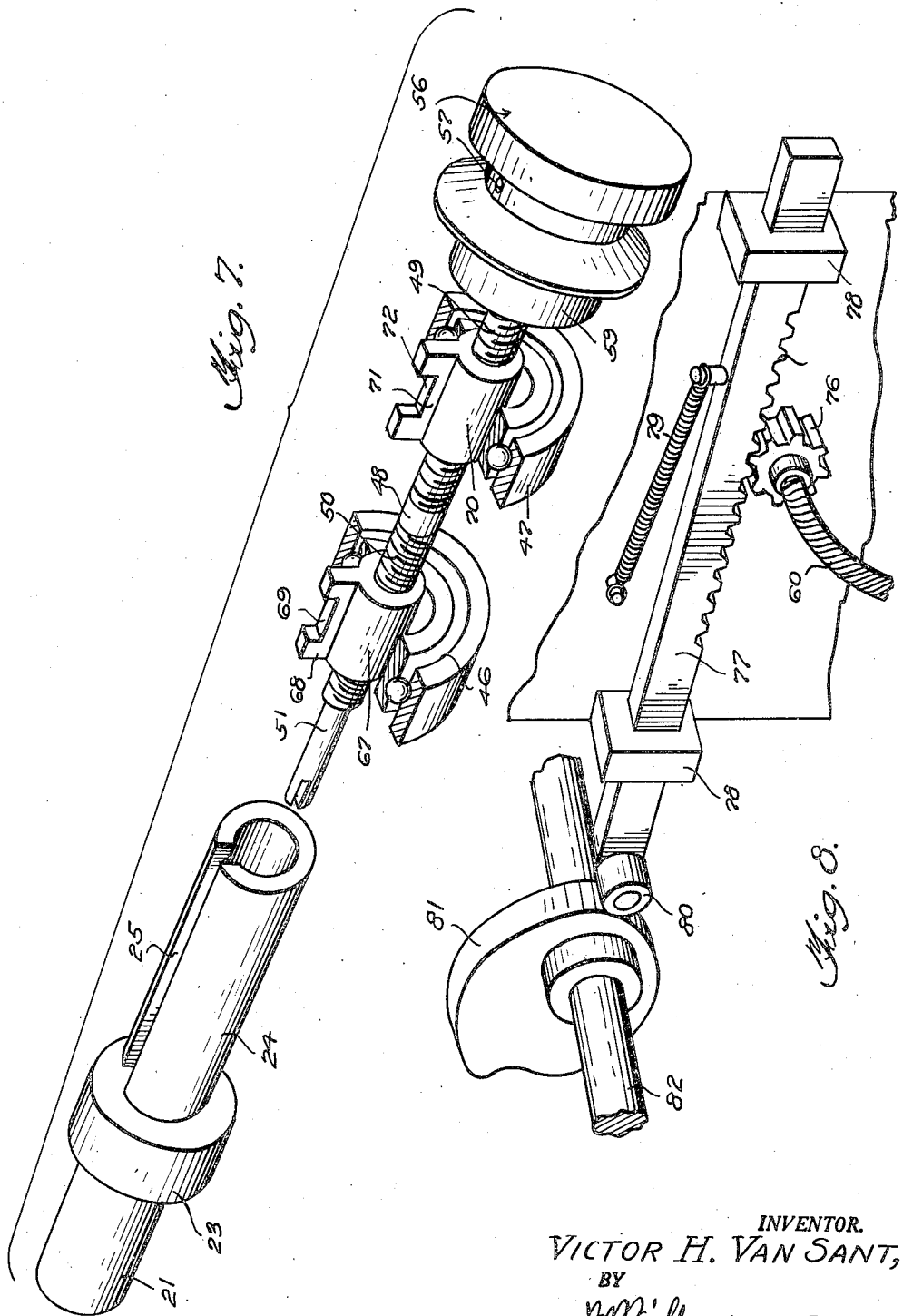

Patented Aug. 26, 1941

2,253,921

UNITED STATES PATENT OFFICE 2,253,921

VARIABLE SPEED TRANSMISSION

Victor H. Van Sant, Westfield, N. J., assignor, by direct and mesne assignments, to Speed-Jack Corporation, Belleville, N. J., a corporation of New Jersey Application June 2, 1941, Serial No. 396,322

8 Claims. (Cl. 74—230.17)

My invention relates to variable speed transmission and has particular reference to such transmission wherein belts engage pulleys which have their effective or pitch diameters varied.

An important object of the invention is to provide apparatus of the above-mentioned character which is extremely compact, simple in construction and highly convenient to adjust.

A further object of the invention is to provide apparatus of the above-mentioned character having the operating means arranged interiorly of the pulleys, excepting for a part extending exteriorly thereof for manual movement.

A further object of the invention is to provide apparatus of the above-mentioned character wherein the pulleys are initially positively adjusted to vary their effective or pitch diameters and will shift laterally to automatically compensate for the change in the center distances between the pulleys engaged by the belts.

A further object of the invention is to provide apparatus of the above-mentioned character having remote control for regulating the speed changes.

A further object of the invention is to so shape the belt engaging faces of the disks that the V-belts will have the maximum engaging area with the faces when the disks are adjusted to vary their effective or pitch diameters.

Other objects and advantages of the invention will be apparent during the course of the following description.

Figure 5:
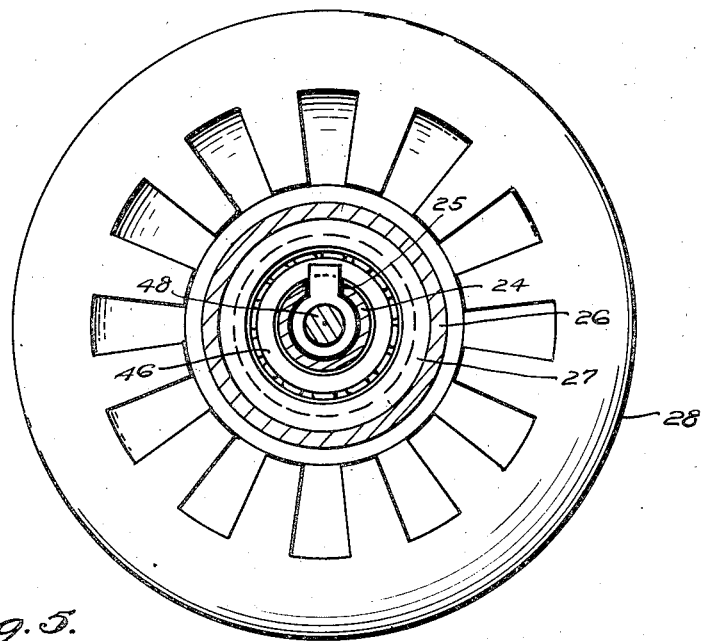
Figure 6:
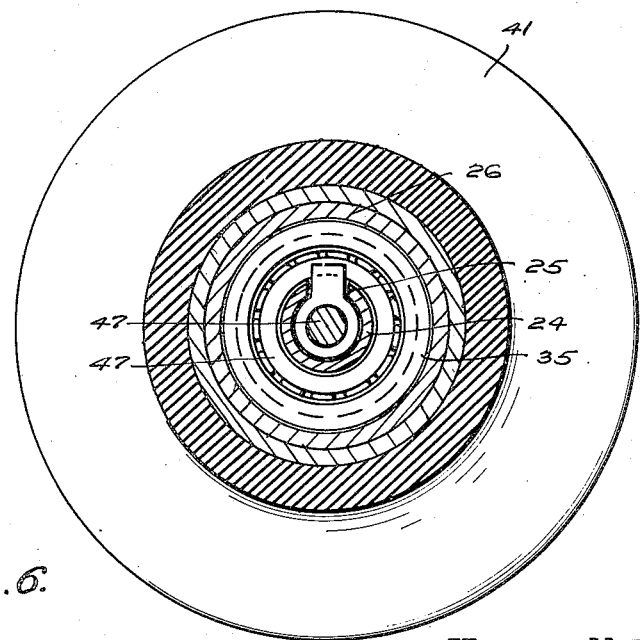

In the accompanying drawings forming a part of this application and in which like numerals are employed to designate like parts throughout the same, Figure 1 is an end elevation of apparatus embodying my invention, showing the same in use, Figure 2 is a plan view of the unit including the disks, Figure 3 is a side elevation of a dial included in the remote control, Figure 4 is a longitudinal section taken on line 4—4 of Figure 2, Figure 5 is a transverse section taken on line 5—5 of Figure 4, Figure 6 is a similar view taken on line 6—6 of Figure 4, Figure 7 is an exploded perspective view of the rotary shifting shaft and associated elements, and, Figure 8 is a perspective view of automatic means for rotating the flexible shaft to effect remote control.

In the drawings, wherein for the purpose of illustration is shown a preferred embodiment of my invention, the numeral 10 designates the frame of any suitable machine having a rotary part to be driven at variable speeds. The frame includes a base 11 and leg 12. Mounted upon the base 11 is a prime mover such as a motor 13, driving a grooved pulley 14 having a groove which is generally V-shaped in cross-section.

The numeral 15 designates a vertically swinging arm having a fork 16 pivoted at 17, upon a bracket 18.

The arm 15 is provided with a tubular head 19, preferably formed integral therewith. This head has a bore 20 to receive a tube 21 held in place by a lock-pin 22. Formed integral with one end of the tube 21 is an annular shoulder or ring 23, having a cylindrical tube 24 integral therewith. The tube 24 is provided with a longitudinal slot 25 and one end of the tube is open, as shown.

Surrounding the tube 24 in spaced concentric relation is a main sleeve 26 receiving in one end thereof a collar 27 to receive the ring 23 but having clearance therewith. The numeral 28 designates a disk, having a hub 29 provided with an insert 30. The hub has a dog-pointed set screw 31 which passes through openings 32 formed in the elements 30, 26 and 27 and locking these parts together so that they move as a unit. The numeral 33 designates an intermediate disk, having an insert 34, slidably mounted upon the sleeve 26. Slidably mounted within the main sleeve 26 is a collar 35. The disk 33 is provided with a dog-pointed set screw 37 having a part 38, extending through an opening in the insert 34, through an elongated slot 39 in the sleeve 26 and into an opening 40 formed in the slidable collar 35. The numeral 41 designates an end disk having a hub 42 provided with an insert 43. This hub is equipped with a dog-pointed set screw 44 extending through an opening 45 formed in the elements 43 and 26 and connecting these parts so that they move as a unit.

The main sleeve 26 is supported by the tube 24 and to effect this the collar 27 carries a ball-bearing 46 arranged internally of the same and receiving the tube 24. The collar 35 is provided with an internally arranged ball-bearing 47, receiving the tube 24. It is thus seen that the tube 24 carries the entire load. The collar 27 has a removable part 27' to permit of the insertion of the bearing 46 and the collar 35 has a removable part 35' to permit of the insertion of the bearing 47.

The numeral 48 designates a disk shifting shaft extending through the tube 24 and having right and left screw-threaded portions 49 and 50. At one end, the shaft 48 has a reduced portion 51 extending through the bore of the ring 23 and tube 21. This reduced portion is rotatably mounted within this bore and carries a collar 52 held thereon by a set screw 53 with a spring washer 54 to provide suitable friction, arranged as shown, to prevent improper or accidental rotation of the shaft 48. At its outer end, the screw-threaded portion 49 of the shaft 48 is screwed into a brass insert 55 formed in a head 56, formed of "Bakelite" or the like. These parts are locked together by a pin 57. A steel washer 58 is arranged at the end of the tube 24 adjacent to the insert 55, as shown. The head has a reduced portion 59, extending into the sleeve 26 but having a clearance therewith. This head serves to close the end of the sleeve 26 and may also be employed to turn the shaft 48, if desired.

A remote control is provided to turn the shaft 48, comprising a wire or flexible shaft 60, secured to a coupling 61, in turn attached to the reduced portion 51 of the shaft 48. The wire or flexible shaft extends to a point remote from the shaft 48 and is connected with a knob 60' which may be manually operated to turn the shaft 60. The knob 60' is connected with a gear 62, engaging a gear 63, engaging a larger gear 64. This larger gear turns a pointer 65, moving in proximity to a scale 66. The gear ratio between the gears 62 and 64 is shown as 4 to 1, for the purpose of illustration, so that when the pointer 65 has made a complete revolution with respect to the scale or dial 66 the shaft 48 will be turned for four revolutions, which is sufficient to shift the disks to the maximum extent. This gear ratio may be varied and will depend upon the pitch of the threads of the screw-threaded portions 49 and 50 of the shaft 48.

Arranged within the tube 24 is a nut 67, having a screw-threaded opening to receive the screw-threaded portion 50 and this nut has a radial extension 68, projecting through the slot 25 and the extension has a notch 69 to receive a part of the ball-bearing 46, to shift the same. The numeral 70 designates a nut having a screw-threaded opening to receive the screw-threaded portion 49 and this nut has a radial extension 71 projecting through the slot 25, and having a notch 72 to receive a portion of the ball-bearing 47. It is thus seen that when the shaft 48 is turned in one direction the nuts 67 and 70 will be moved in opposite directions. This movement of the nut 67 will shift the disks 28 and 41 in the same direction and the movement of the nut 70 will shift the disk 33 in an opposite direction to the movement of the disks 28 and 41.

The disk 28 has an inner substantially coned face 73 and the other disk 41 has a similar substantially coned face 74 while the intermediate disk 33 has a pair of substantially coned faces 75. These faces are not true cones but they are preferably slightly spherically curved in a plane extending longitudinally of the sleeve 26. The purpose of this is to effect the maximum area of contact between the V-belts and the substantially coned faces, at the various points of adjustment of the disks. By curving the faces 73, 74, and 75, as described the inner portions of the V-belts will be widened while the outer portions will be somewhat narrowed below their normal width due to the fact that the outer portions are under tension while their inner portions are under compression, as the effective or pitch diameter of the belt decreases. The disk 28 has its face 73 provided with spaced teeth 73' to interfit or telescope with spaced teeth 75' formed in the face 75 of the disk 33 and the disk 41 has its face 74 provided with spaced teeth 74' to interfit or telescope with teeth 76' formed upon the adjacent face 75 of the disk 33. The purpose of these interfitting or telescoping teeth is to enable the disks to be brought closer together and hence to increase the ratio of pitch diameters of the disks.

Referring now to Figure 1, the numeral 76 designates a V-belt which may be made of rubber having suitable fabric reinforcement. This V-belt engages the pulley 14 between the disks 28 and 33. Engaging between the disks 41 and 33 is a second V-belt 77, the upper end of which engages a grooved pulley 77' to be driven (as shown) and which has a fixed bearing.

The operation of the apparatus is as follows:
The arm 15 being pivotally supported, is free to swing in a vertical plane, and hence the unit including the several disks will raise or lower, to compensate for the varying distances between the centers of the pulleys engaged by the belts 76 and 77. To increase the speed of the driven member the knob 60', viewed from Figure 3, will be turned counter-clockwise whereby the shaft 48 is turned in a direction to move the nut 67 to the left, Figure 4. This movement of the shaft 48 moves the disks 28 and 41 to the left and also moves the disk 33 to the right. The disks 28, 41, and 33 all move simultaneously in unison so that the center line of the belts is preserved. To decrease the speed, the knob 60' is turned in the reverse direction. The disks may also be shifted to vary the speed by turning the head 56, as is obvious.

The remote control may be automatically operated as well as manually operated. When it is desired to automatically operate the remote control the wire or flexible shaft 60 is connected with a gear 76, engaging a reciprocatory rack 77. This rack moves in stationary guides 78 and is shifted in one direction by a retractile coil spring 79. Secured to one end of the rack 77 is a roller 80, engaging a cam 81 mounted upon a shaft 82, driven by any suitable means. There are numerous machines having operating parts which it is desirable or necessary to drive at varying speeds, such as, for example, a screw machine. My automatic remote control would be very desirable for use in connection with such machines.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. In variable speed gearing, a support, a tube mounted upon the support, a main sleeve mounted upon the tube to rotate and move axially with relation thereto, disks mounted upon the sleeve to move axially and rotate with the sleeve, said disks having substantially coned faces, a disk arranged in cooperative relation with the first named disks and mounted upon the sleeve to rotate therewith and move axially with relation to the sleeve, the last named disk having substantially coned faces, a rotary shaft arranged within the tube and having right and left screw-threaded portions, a nut engaging one screw-threaded portion and serving to shift the sleeve axially, a nut engaging the other screw-threaded portion and serving to shift the last named disk axially, and means to turn the shaft.

2. In variable speed gearing, a support, a tube mounted upon the support, a main sleeve surrounding the tube to rotate and move axially with relation to the tube, outer disks mounted upon the sleeve to move axially and rotate with the sleeve, the said outer disks having substantially coned faces, an intermediate disk arranged between the outer disks and mounted upon the sleeve to rotate therewith and move axially with relation thereto, the intermediate disk having substantially coned faces, a rotary shaft arranged within the tube and having right and left screw-threaded portions, a nut engaging one screw-threaded portion and serving to shift the sleeve axially, a nut engaging the other screw-threaded portion and serving to shift the intermediate disk axially, the arrangement being such that the nuts shift the sleeve and intermediate disk in opposite directions, and means to rotate the shaft.

3. In variable speed gearing, a support, a tube mounted upon the support and having a longitudinal slot, a sleeve surrounding the tube and adapted to be rotated and moved axially with relation thereto, disks mounted upon the sleeve to rotate and move axially with the sleeve, a disk arranged in cooperative relation to the first named disks and mounted upon the sleeve to rotate therewith and move axially with relation thereto, all of said disks having substantially coned faces, a rotatable shaft within the tube and having right and left screw-threaded portions, a bearing arranged between the sleeve and tube and connected with the sleeve to shift it axially, a nut mounted upon one screw-threaded portion and engaging the bearing to shift it axially of the tube, a second bearing arranged between the sleeve and tube and connected with the last named disk to shift it axially, a nut engaging the other screw-threaded portion and engaging the second named bearing to shift it axially of the tube, and means to rotate the shaft.

4. In variable speed gearing, a support, a tube mounted upon the support and having a longitudinal slot, a rotatable shaft within the tube having right and left screw-threaded portions, a sleeve surrounding the tube, outer disks rigidly mounted upon the sleeve, the outer disks having substantially coned faces, the sleeve having a longitudinal slot between the faces, an intermediate disk mounted upon the sleeve to move longitudinally thereof, a pin secured to the intermediate disk and extending through the slot of the sleeve to the interior of the sleeve, a ball-bearing slidably mounted upon the tube and connected with the sleeve to move it axially, a nut engaging one screw-threaded portion and having a radial extension passing through the slot of the tube and engaging the ball-bearing to shift it axially of the tube, a second ball-bearing mounted upon the tube to move axially thereof and connected with the pin, a second nut having a radial extension projecting through the slot of the tube and engaging the second ball-bearing to shift it axially of the tube, and means to turn the shaft.

5. In variable speed gearing, a tube having a longitudinal slot, said tube having a tubular extension provided with a reduced bore, a rotatable shaft arranged within the tube and having right and left threaded portions, said shaft having a reduced portion rotatably mounted within the reduced bore of the tubular extension, means to rotate the shaft, a sleeve arranged about the tube and rotatable and axially movable with relation to the tube, disks mounted upon the sleeve to move therewith as a unit and having substantially coned faces, a nut engaging one screw-threaded portion and connected with the sleeve to shift it axially, a disk mounted upon the sleeve to rotate therewith and move axially with relation thereto and having substantially coned faces and disposed in cooperative relation with said disks, a nut engaging the other screw-threaded portion and connected with the last named disk to shift it axially, and means to move the shaft.

6. In variable speed gearing, a tube having a longitudinal slot, said tube having a tubular extension provided with a reduced bore, said tube having a radially extending flange, a support for holding the tubular extension, a sleeve surrounding the tube, said sleeve receiving the flange in one end thereof, a ball-bearing mounted upon the tube and connected with the sleeve to shift it axially, a second ball-bearing mounted upon the tube, a shaft arranged within the tube and having opposite screw-threaded portions, a nut engaging one screw-threaded portion and connected with the first named ball-bearing to shift it axially, a nut engaging the other screw-threaded portion and connected with the second ball-bearing to shift it axially, disks mounted upon the sleeve to move therewith as a unit and having substantially coned faces, a disk mounted upon the sleeve to move axially thereof and rotate therewith, the last named disk having substantially coned faces, means to connect the last named disk with the second named ball-bearing, a reduced extension secured to the shaft and rotatably mounted within the reduced bore of the tubular extension, means to hold the reduced extension within the reduced bore of the tubular extension, a head secured to the free end of the shaft and having a part extending into the opposite end of the sleeve, and means to rotate the shaft.

7. In a variable speed gearing, a support, a tube mounted upon the support and having a longitudinal slot, a main sleeve surrounding the tube to rotate and move axially with relation to the tube, outer disks mounted upon the sleeve to move axially and rotate with the sleeve, said outer disks having substantially coned faces, an intermediate disk arranged between the outer disks and mounted upon the sleeve to rotate therewith and move axially with relation thereto, the intermediate disk having substantially coned faces, a bearing mounted upon the tubular shaft and carrying the main sleeve and also serving to shift the main sleeve axially with relation to the tube, a collar arranged within the main sleeve and supporting the same, the collar being axially movable with relation to the main sleeve, means connecting the collar with the intermediate disk so that the collar shifts the intermediate disk axially, a bearing mounted upon the tube and supporting the collar and also serving to shift the collar axially, a shaft extending longitudinally within the tube and rotatable with relation thereto and having right and left screw-threaded portions, a nut engaging one screw-threaded portion and engaging one bearing to shift it axially, a nut engaging the other screw-threaded portion and engaging the other bearing to shift it axially, and means to turn the screw-threaded shaft.

8. In variable speed gearing, a support, a tube mounted upon the support and having a longitudinal slot, a main sleeve surrounding the tube to rotate and move axially with relation to the tube and having a longitudinal slot in its intermediate portion, outer disks mounted upon the main sleeve to move axially and rotate with the main sleeve, the outer disks having substantially coned faces, an intermediate disk arranged between the outer disks and mounted upon the main sleeve, a pin connected with the intermediate disk and extending inwardly through the intermediate slot of the main sleeve so that the intermediate disk rotates with the main sleeve and is movable axially with relation thereto, a collar arranged within the main sleeve for supporting the same and connected therewith to shift the main sleeve axially, a bearing carried by the tube and engaging the collar to support it and shift it axially, a second collar mounted within the main sleeve to support it and axially movable with relation to the main sleeve and connected with the pin to shift it, a second bearing mounted upon the tube and engaging the second collar to support it and shift it axially, a shaft extending longitudinally within the tube and rotatable with relation thereto and having right and left screw-threaded portions, a nut engaging one screw-threaded portion and engaging one bearing to shift it axially, a nut engaging the other screw-threaded portion and engaging the other bearing to shift it axially, and means to rotate the shaft.

VICTOR H. VAN SANT.